United States Patent
Nishiyama et al.

(10) Patent No.: US 7,679,621 B2
(45) Date of Patent: Mar. 16, 2010

(54) IMAGE PROCESSING APPARATUS AND METHOD

(75) Inventors: Masashi Nishiyama, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 631 days.

(21) Appl. No.: 11/516,767

(22) Filed: Sep. 7, 2006

(65) Prior Publication Data
US 2007/0065015 A1    Mar. 22, 2007

(30) Foreign Application Priority Data
Sep. 7, 2005    (JP) .............................. 2005-259895

(51) Int. Cl.
G09G 5/00    (2006.01)
G06K 9/40    (2006.01)

(52) U.S. Cl. ..................... 345/611; 382/264; 345/581

(58) Field of Classification Search ................ 345/607, 345/608, 609, 610, 611, 612, 615, 616, 581; 382/262, 264, 108
See application file for complete search history.

(56) References Cited

U.S. PATENT DOCUMENTS

| | | | |
|---|---|---|---|
| 5,991,456 A | 11/1999 | Rahman et al. | |
| 6,466,685 B1 | 10/2002 | Fukui et al. | |
| 6,639,594 B2 * | 10/2003 | Zhang et al. | 345/426 |
| 6,731,821 B1 * | 5/2004 | Maurer et al. | 382/263 |
| 6,876,777 B2 * | 4/2005 | Liu | 382/266 |
| 6,947,178 B2 * | 9/2005 | Kuo et al. | 358/3.08 |
| 7,039,236 B2 * | 5/2006 | Hashimoto et al. | 382/218 |
| 7,327,877 B2 * | 2/2008 | Kita | 382/167 |
| 2003/0123734 A1 * | 7/2003 | Li et al. | 382/190 |
| 2005/0254721 A1 * | 11/2005 | Hagiwara | 382/260 |

FOREIGN PATENT DOCUMENTS

| | | |
|---|---|---|
| CN | 1592352 A | 3/2005 |
| EP | 1 511 295 A2 | 3/2005 |

OTHER PUBLICATIONS

Wang et al., "Generalized Quotient Image", IEEE Conference on Computer Vision and Pattern Recognition, vol. 2, pp. 498-505, (2004).

Mukaigawa et al., "Photometric Image-Based Rendering for Image Generation in Arbitrary Illumination", IEEE International Conference on Computer Vision, vol. 2, pp. 652-659, (2001).

* cited by examiner

Primary Examiner—Kee M Tung
Assistant Examiner—Robert Craddock
(74) Attorney, Agent, or Firm—Finnegan, Henderson, Farabow, Garrett & Dunner, L.L.P.

(57) ABSTRACT

An object recognition apparatus in an embodiment includes an image input unit, an object detection unit, a diffuse reflection image generation unit, an object model storage unit, a difference image generation unit, a weight calculation unit, a weighted Gaussian filter application unit, a filter processing unit, and an identification unit. A weight to be assigned to a weighted Gaussian filter is determined in view of variations in lighting conditions and reflection components of pixels of an input image.

10 Claims, 8 Drawing Sheets

FIG. 6
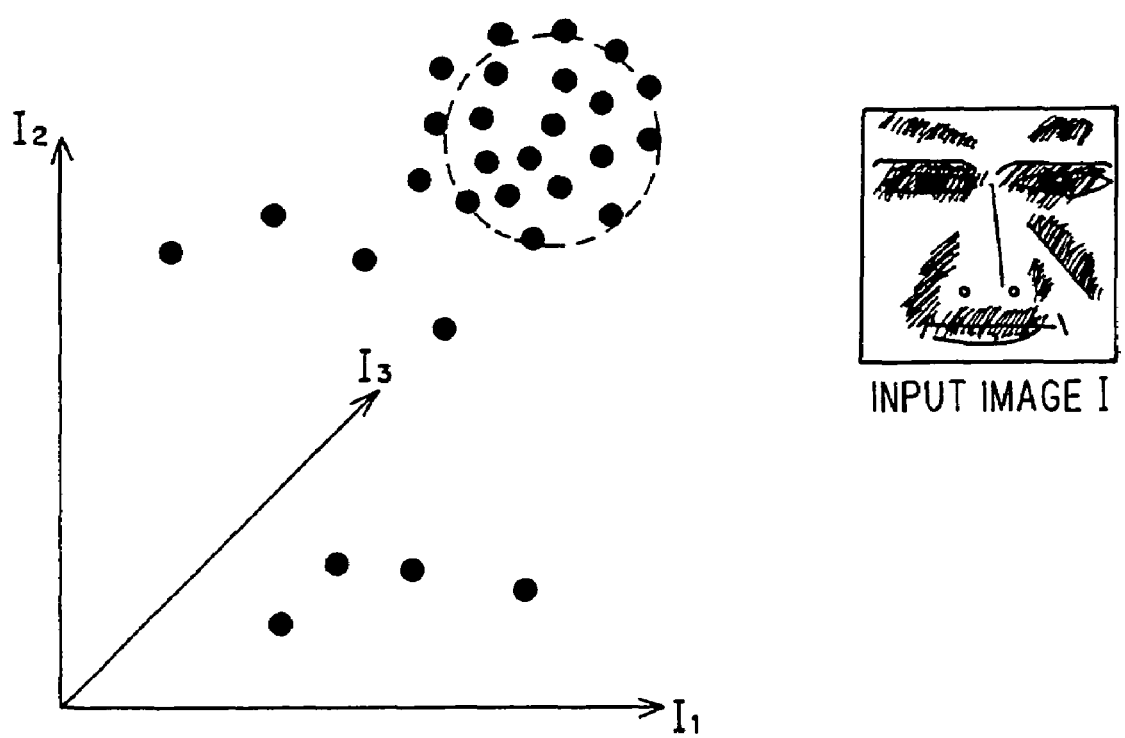
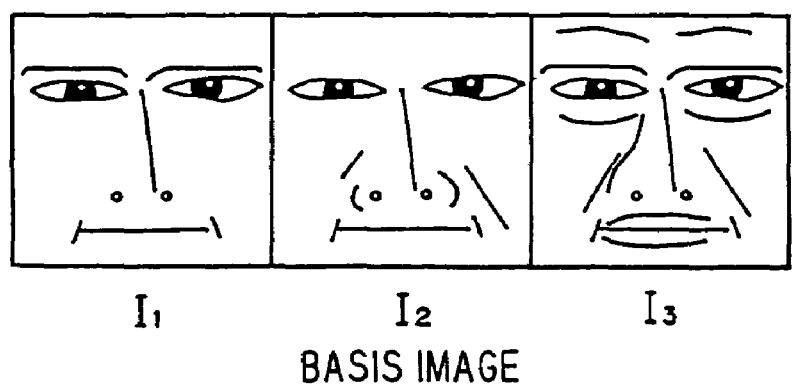

F I G. 8
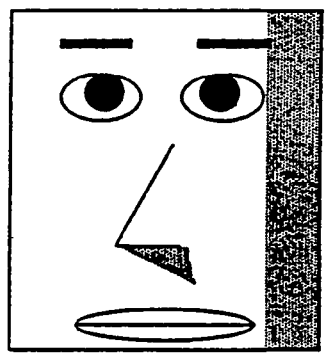  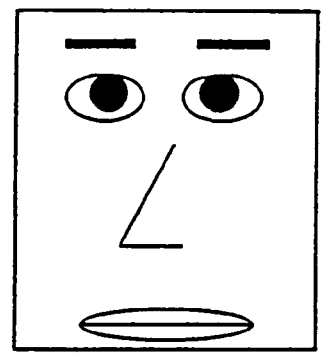
501　　　　　　　　　502　　　　　　　　　503

IMAGE PROCESSING APPARATUS AND METHOD

CROSSREFERENCE TO RELATED APPLICATIONS

This application is based upon and claims the benefit of priority from the prior Japanese Patent Application No. 2005-259895, filed on Sep. 7, 2005; the entire contents of which are incorporated herein by reference.

FIELD OF THE INVENTION

The present invention relates to an image processing apparatus and method which raises accuracy of image processing by removing the influence caused by illumination from an image having an object to be recognized, and by extracting a feature intrinsic to the object.

DESCRIPTION OF THE BACKGROUND

When to make recognition of an object from the image, it is necessary to minimize the influence caused by illumination variation which would decrease success rate of the recognition. For this purpose, in WANG (Haitao Wang, Stan Z. Li, Yangsheng Wang, Generalized Quotient Image, Proceedings IEEE Conference on Computer Vision and Pattern Recognition, vol. 2, (2004) 498-505), there is proposed a method in which in face image recognition, a filter processing called "Self Quotient Image" is applied to an input image, so that the intrinsic feature robust against varying illumination is extracted, and the object recognition is performed.

The "Self Quotient Image" is a method in which "Center/Surround Retinex" of RAHMAN (METHOD OF IMPROVING A DIGITAL IMAGE, U.S. Pat. No. 5,991,456) is extended. An output image R(x, y) of the Center/Surround Retinex to an input image I(x, y) is defined by expression (1).

$$R(x, y) = \frac{I(x, y)}{G(x, y) * I(x, y)} \quad (1)$$

Where, G(x, y) denotes a Gaussian function, and "*" denotes convolution. In RAHMAN, a Gaussian filter is applied to an input image to generate a smoothed image. In WANG, a weighted Gaussian filter is applied to an input image to generate a smoothed image.

There is a merit that the intrinsic feature robust against varying illumination can be calculated from only one given image, and the method is especially effective in the case where only one registration image can be obtained.

In the Center/Surround Retinex, as described in RAHMAN, when a normal direction and a lighting condition are constant in a local area of an input image, invariance to a diffuse reflection can be obtained. Diffuse reflection is one of the components caused by varying illumination.

However, in the case where the lighting condition varies in the local area, mainly in the case where a shadow is formed, the invariance can not be obtained, and erroneous recognition or identification is caused. The shadow area is formed on an object when light beams from a first light source are blocked by another object. Because the shadow area is illuminated by second light source (for example, environmental light) other than the first light source, the lighting condition in the shadow area is different from that in other areas.

FIG. 8 shows an example in which the Center/Surround Retinex is applied to a face image.

In an image 502, the influence caused by illumination is suppressed. The image 502 is generated from a face image 501 in which a shadow is formed on a person's face in an area on right-hand side and under a nose. However, since the lighting conditions in the shadow areas are different from those in other areas, it is impossible to completely remove the influence caused by illumination variations, as schematically indicated in the face image 502.

In order to prevent halo effects around edge, in the Self Quotient Image, when a smoothed image is generated, a weighted Gaussian filter (a weight function having anisotropic waveform is applied to a Gaussian function having isotropic waveform) is used. The weight function divides a local area into two sub-areas using the binarization.

However, in the binarization, there is a possibility that an area with a low albedo (for example, in the case of the face image recognition, a pupil or an eyebrow) is also erroneously detected as a shadow area. The important information representing the feature of the object would be also removed.

Besides, in an area where a pixel value is gradually changed like a soft shadow formed in a contour portion of a shadow area, since it is difficult to set a suitable threshold, an irregular or improper recognition would occur in the binarization technique.

Further, in an area where for example, specular reflection occurs and a reflection component varies, since it is difficult to extract a value of a diffuse reflection component from only the one given input image, the invariance can not be calculated in the conventional method.

SUMMARY OF THE INVENTION

According to embodiments of the present invention, an image processing apparatus comprises: a weight calculation unit configured to calculate a weight of a weighted smoothing filter, a first filter unit configured to generate a smoothed image by applying the weighted smoothing filter to the input image, and a second filter unit configured to obtain the feature image by dividing a pixel value of the input image by a pixel value of the smoothed image, wherein the weight calculation unit includes (1) a diffuse reflection image generation unit configured to generate a diffuse reflection image by using a model having a diffuse reflection component as a main component, the diffuse reflection image approximating the input image, and (2) a difference image generation unit configured to generate a difference image between the diffuse reflection image and the input image, and the weight calculation unit evaluates a difference value between pixel values of each noted pixel and its surrounding pixel in the difference image, and assigns to the surrounding pixel a weight that decreases with increase of the difference value.

BRIEF DESCRIPTION OF THE DRAWINGS

FIG. 6 is a view showing an example in which a coefficient is estimated from three points selected at random in an input image and by using basis images.

FIG. 8 is a view showing an example in which a feature image robust against illumination variation is extracted from a face image.

DETAILED DESCRIPTION OF THE INVENTION

Hereinafter, embodiments of the present invention will be described with reference to the drawings.

The embodiments of the invention will be described while face image recognition is used as an example. The outline of each of the embodiments is as follows.

In a first embodiment, a description will be given to an object recognition apparatus 100 in which even in a case where a shadow area is formed in a face image, an intrinsic feature effective for recognition or identification of a person is extracted to facilitate face recognition.

In a second embodiment, a description will be given to an object recognition apparatus 200 in which even in a case where a shadow area and a specular reflection area are formed in a face image, an intrinsic feature effective for the identification is extracted to facilitate face recognition.

In a third embodiment, a description will be given to an object recognition apparatus 300 in which even in a case where a facing or gazing direction of a person's face on an image is directed not only in the front direction but also in various directions, an intrinsic feature robust against illumination variation is extracted to facilitate face recognition.

In a fourth embodiment, a description will be given to an object recognition apparatus 400 in which noise is removed, an intrinsic feature robust against illumination variation is extracted to facilitate face recognition.

First Embodiment

The object recognition apparatus 100 of the first embodiment will be described with reference to FIGS. 1, 2, 6 and 7.

In this embodiment, the weight to be assigned to the weighted Gaussian filter is calculated by using a face model.

(1) Structure of the Object Recognition Apparatus 100

Figure 1:
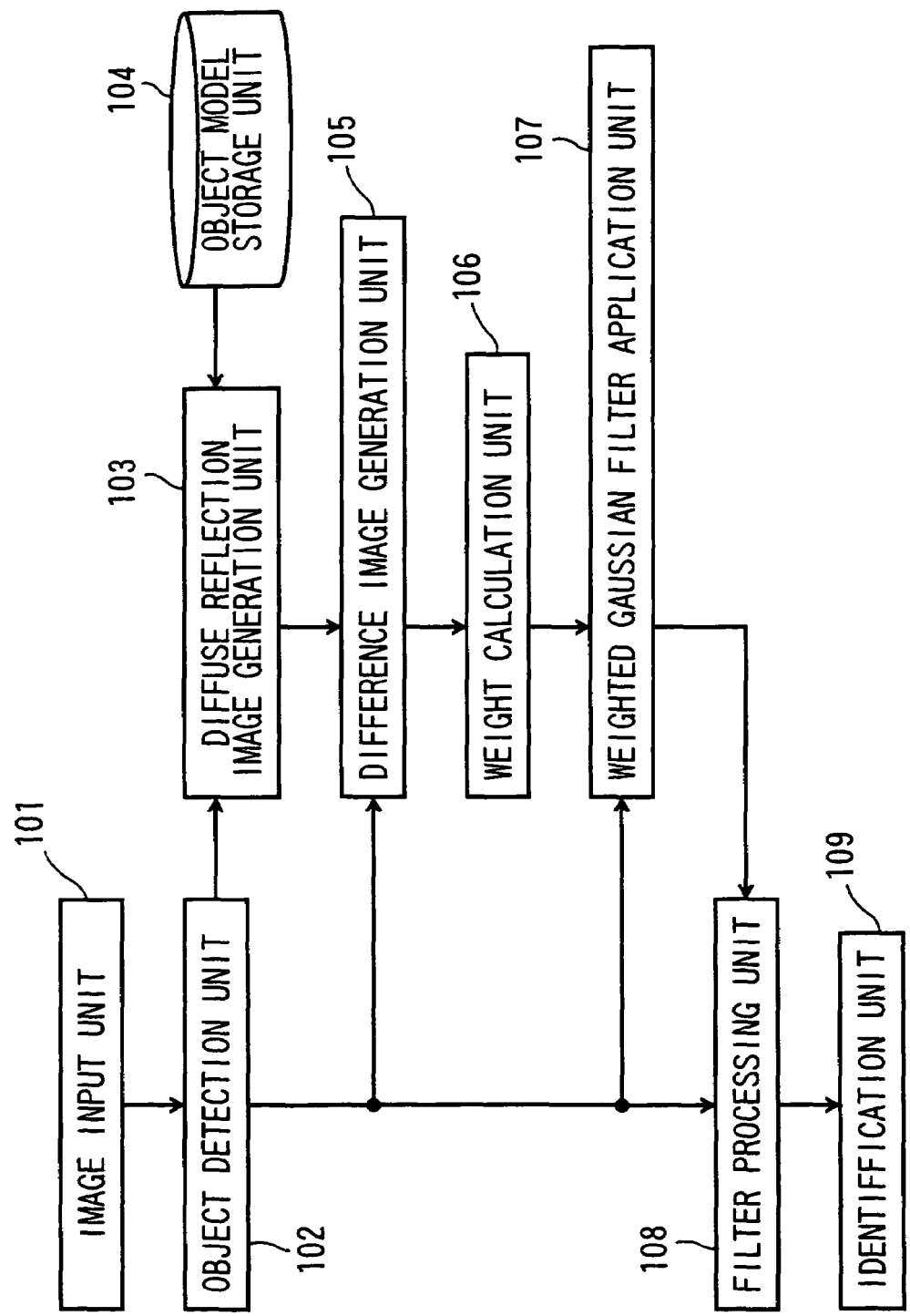
FIG. 1 is a structural view of an object recognition apparatus of a first embodiment.
Figure 2:
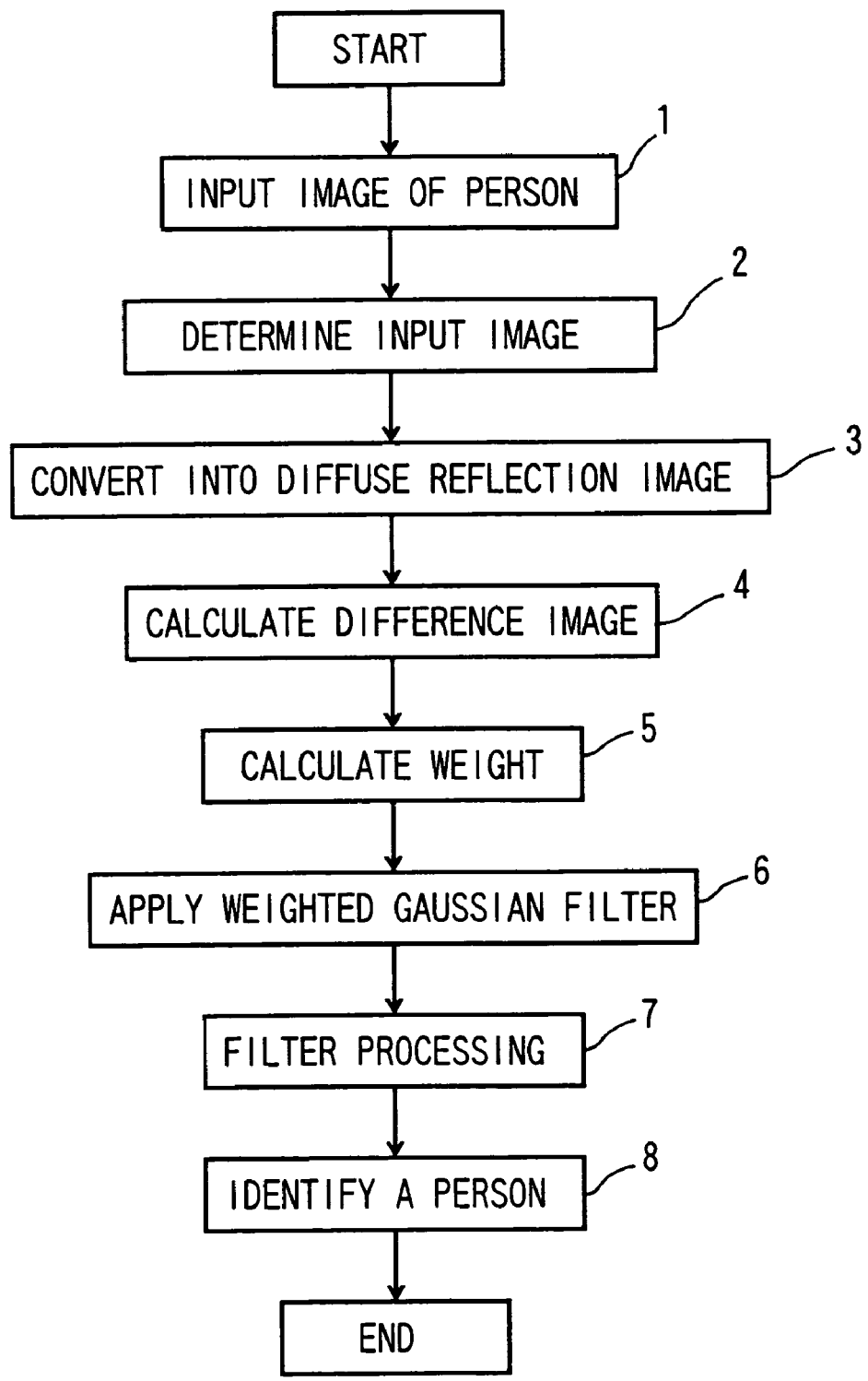
FIG. 2 is a flowchart showing a processing of the object recognition apparatus of the first embodiment.

FIG. 1 shows the structure of the object recognition apparatus 100, and FIG. 2 shows a flowchart of its processing.

The object recognition apparatus 100 includes an image input unit 101, an object detection unit 102, a diffuse reflection image generation unit 103, an object model storage unit 104, a difference image generation unit 105, a weight calculation unit 106, a weighted Gaussian filter application unit 107, a filter processing unit 108, and an identification unit 109. The function of each of the units 101 to 109 may be realized by a program stored in a computer.

(2) Image Input Unit 101

As indicated in step 1 of FIG. 2, the image input unit 101 takes an image of a person as an object to be recognized, by using a camera. One image is taken, or images are temporally continuously taken. A description will be made on the assumption that the face direction of the photographed object is directed in the front direction with respect to the camera, and the light source is a single light source at infinity.

(3) Object Detection Unit 102

As indicated in step 2, the object detection unit 102 cuts out a face area from the image outputted from the image input unit 101, and determines an input image I. I(x, y) denotes a pixel value of a pixel (x, y) on the input image I. Feature points of the face, such as the pupil and the nostril, are extracted, and the input image may be determined based on the positional relation of these points. Besides, a partial area of the face area, such as the eye or the nose, may be used as the input image. An image obtained by dividing the face area into equal parts may be used as the input image.

(4) Diffuse Reflection Image Generation Unit 103

As indicated in step 3, the diffuse reflection image generation unit 103 uses a diffuse reflection image generation model stored in the object model storage part 104 and converts the input image I outputted from the object detection unit 102 into a diffuse reflection image. Incidentally, although the diffuse reflection image is represented in expressions by a symbol in which "~" is placed over "I", since this symbol can not be represented in the specification, the diffuse reflection image will be represented by "I~". I~(x, y) denotes a pixel value of a pixel (x, y) on the diffuse reflection image I~.

As the diffuse reflection image generation model, basis images may be used as described in MUKAIGAWA (Yasuhiro Mukaigawa, Hajime Miyaki, Sadahiko Mihashi, Takeshi Shakunage, Photo-metric, Image-Based Rendering for Image Generation in Arbitrary Illumination, IEEE International Conference on Computer Vision, vol. 2, (2001) 9652-659). This is based on the principle of expression (2), each pixel value I~(x, y) of an image I~ under an arbitrary light source condition can be represented by the linear combination of pixel values Ii(x, y) of three basis images Ii when the image I~ consists of diffuse reflection component.

$$\tilde{I}(x,y) = \max(c_1 I_1(x,y) + c_2 I_2(x,y) + c_3 I_3(x,y), 0) \quad (2)$$

Where, max(·, 0) denotes replacement from a negative value to 0. It is assumed that the direction of an object in the basis image Ii is constant.

As shown in FIG. 6, the input image is converted into the diffuse reflection image by estimating a coefficient ci to the input image I. The coefficient may be estimated by using the least square method with projection on a subspace spanned by the basis image Ii, or a robust estimation to perform processing while removing an outlier (shadow area or specular reflection area) as in MUKAIGAWA.

As the basis image Ii, three face images are used which are taken while the light source direction is changed so that the shadow and specular reflection do not occur. The three basis images I1, I2 and I3 must be linearly independence from one another. Alternatively, the basis images may also be generated by applying singular value decomposition to four or more images.

When basis images Ii are prepared from same person of the input image I, the coefficients ci of the expression (2) are estimated under a small error. The coefficient ci may be estimated for each condition including the direction of the light source and the intensity of illumination.

The coefficient can be estimated also from the basis images of another person. That case is dealt with by increasing the number of the basis images. The input image I is divided into plural areas, and the coefficient may be estimated for each area.

As another diffuse reflection image generation model, a three-dimensional shape of a face obtained by a range finder and albedo may be used.

(5) Difference Image Generation Unit 105

Figure 7:
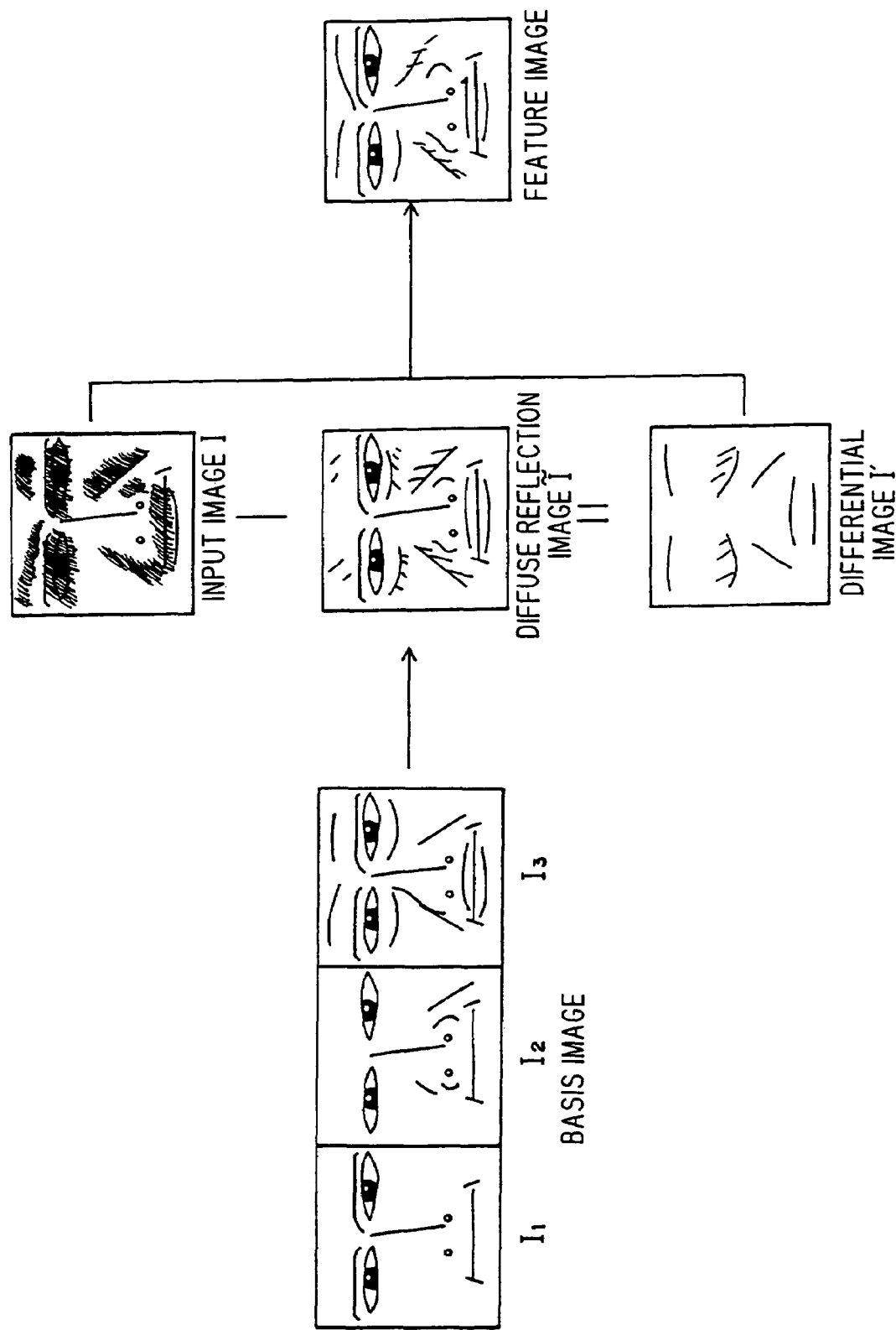
FIG. 7 is a view showing an example in which an input image is converted into a diffuse reflection image by using plural basis images, and the input image is converted into a feature image by using a difference image between the input image and the diffuse reflection image.

As indicated in step 4, the difference image generation unit 105 generates, as shown in FIG. 7, a difference image I' from the diffuse reflection image I˜ outputted from the diffuse reflection image generation unit 103 and the input image I. Each pixel value I' (x, y) of the difference image I' is calculated using each pixel value I˜(x, y) of the diffuse reflection image I˜ and the each pixel value of the input image I.

$$I'(x,y) = I(x,y) - \tilde{I}(x,y) \qquad (3)$$

An area where the pixel value I' (x, y) of the difference image I' has a negative value corresponds to a shadow area in the input image I, and an area where pixel value I' (x, y) of the difference image I' has a positive value corresponds to a specular reflection area in the input image I. As stated above, the pixel value I' (x, y) of the difference image I' indicates the difference in the lighting condition and the reflection component of the input image I.

(6) Weight Calculation Unit 106

As indicated in step 5, the weight calculation unit 106 calculates a weight to be assigned to the weighted Gaussian filter by using the difference image I' outputted from the difference image generation unit 105.

The weight is determined by comparing the lighting condition of a noted pixel corresponding to the center or origin coordinates of the Gaussian filter with the lighting condition of a pixel corresponding to surrounding coordinates of the Gaussian filter.

For example, when coordinates of the noted pixel corresponding to the center of the Gaussian filter are (x0, y0), the weight W(x, y) is determined by expression (4).

$$W(x, y) = \frac{1}{1 + \alpha |I'(x, y) - I'(x_0, y_0)|} \qquad (4)$$

Where, α denotes an arbitrary coefficient, and |·| denotes an absolute value.

The meaning of expression (4) will be described. When a difference value between a pixel value I' (x0, y0) of the noted pixel (x0, y0) corresponding to the center coordinates of the Gaussian filter and a pixel value I' (x, y) of the surrounding pixel (x, y) becomes the larger, the larger becomes a difference in a lighting condition or a reflection component between the surrounding pixel and the noted pixel; and thus, the smaller becomes a weight assigned to the surrounding pixel.

For example, in the case where the noted pixel is of the diffuse reflection area, and its surrounding pixel is of the shadow area, the lighting conditions for the noted and surrounding pixels are significantly different from each other, and therefore, the difference value becomes large, and the weight to be assigned to the surrounding pixel becomes small.

On the other hand, in the case where the noted pixel is of the diffuse reflection area and its surrounding pixel is also the diffuse reflection area, lighting conditions are of the same sort. Thus, the difference value becomes small, and the weight to be assigned to the surrounding pixel becomes large.

(7) Weighted Gaussian Filter Application Unit 107

As indicated in step 6, the weighted Gaussian filter application unit 107 uses the weight W(x, y) outputted by the weight calculation unit 106, applies the weighted Gaussian filter to the input image I outputted from the object detection unit 102, and outputs a smoothed image S. S(x, y) denotes a pixel value of a pixel (x, y) on the smoothed image S.

When the average is 0, and the variance is σ2, the Gaussian function G(x, y) is defined by expression (5).

$$G(x, y) = \frac{1}{2\pi\sigma^2} \exp\left(\frac{-(x^2 + y^2)}{2\sigma^2}\right) \qquad (5)$$

The weighted Gaussian filter (W(x, y)G(x, y)) is applied to the input image I by expression (6).

$$S(x, y) = (W(x, y)G(x, y)) * I(x, y) \qquad (6)$$

$$= \int\int \frac{1}{1 + \alpha |I'(u, v) - I'(x, y)|} G(x - u, y - v) I(u, v) du dv \qquad (7)$$

Where, "*" denotes convolution.

(8) Filter Processing Unit 108

As indicated in step 7, the filter processing unit 108 uses the smoothed image S outputted from the weighted Gaussian filter application unit 107, and applies the processing of expression (8) to the input image I outputted from the object detection unit 102.

$$\hat{R}(x, y) = \frac{I(x, y)}{S(x, y)} \qquad (8)$$

Incidentally, although the feature image is represented in the expressions by a symbol in which "^" is placed over "R", since this symbol can not be represented in the specification, the feature image will be represented by "R^". R^(x, y) denotes a pixel value of a pixel (x, y) on the feature image R^. The image after the filter processing is made the feature image R^, and the input vector is converted by raster scanning this feature image. In the expression (8), when S(x, y) is close to 0, a pixel value R^(x, y) of the feature image R^ has an extremely large value and becomes unstable. Thus, the feature image R^ may be obtained from expression (9) in which a function to suppress an outlier is introduced.

$$\hat{R}(x, y) = f\left(\frac{I(x, y)}{S(x, y)}\right) \qquad (9)$$

As f(·), a logistic function or a logarithmic function is used.

(9) Identification unit 109

As indicated in step 8, the identification unit 109 identifies a person by evaluating distances between the input vector, which is outputted from the filter processing unit 108, and pre-registered dictionary vectors; by using, for example, a nearest neighbor classification method or identification technique.

The identification may also be performed by using a subspace method or the like method of pattern recognition.

(10) Advantageous Effects of the First Embodiment

In the object recognition apparatus 100 of this embodiment, even in the case where the shadow area is generated in the face image, the feature quantity intrinsic to a person's face and unaffected by variation of illumination is extracted; and thus, the face recognition with high accuracy is achieved.

Second Embodiment

The object recognition apparatus 200 of the second embodiment will be described with reference to FIG. 3.

(1) Structure of the Object Recognition Apparatus 200

Figure 3:
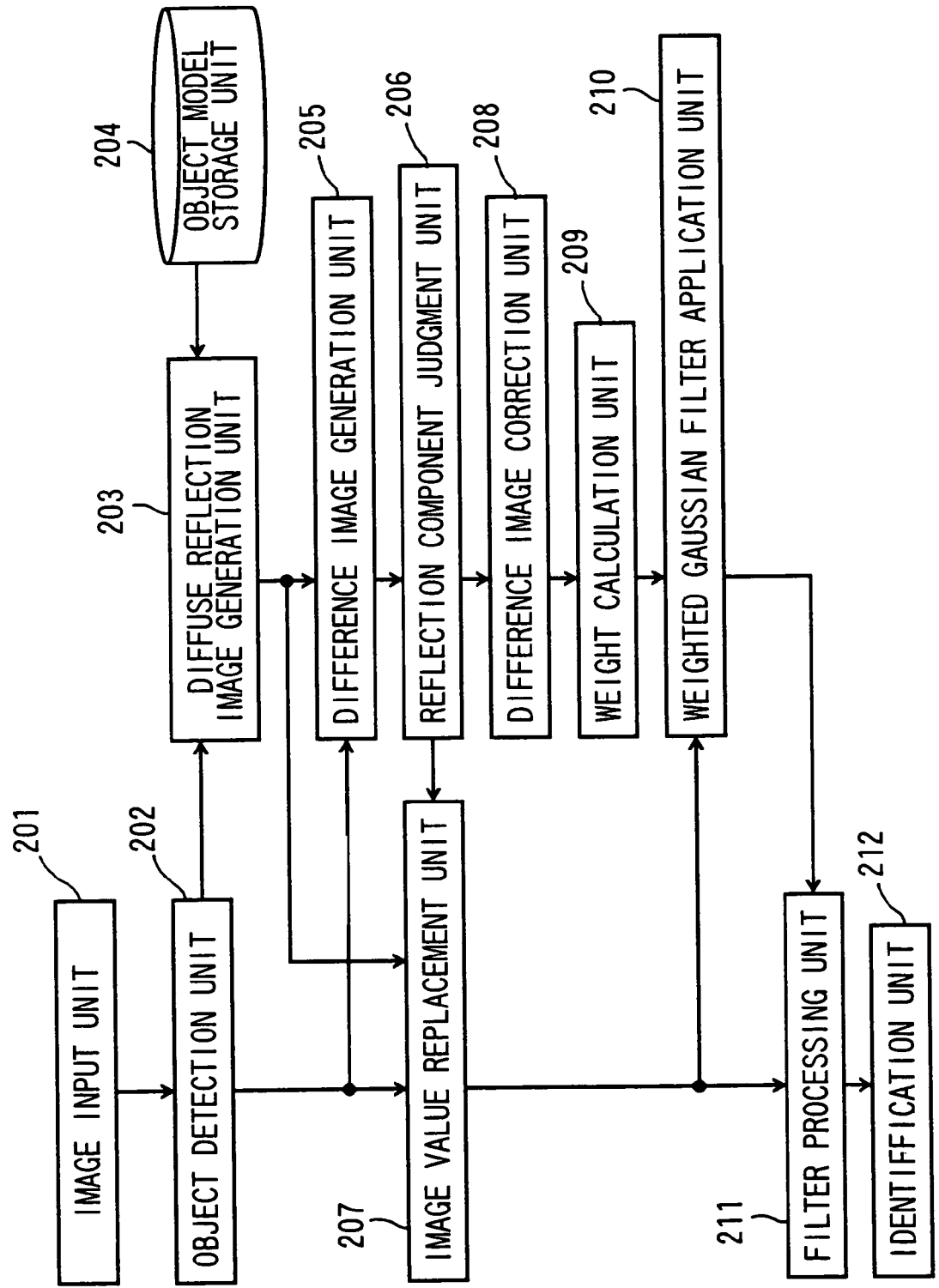
FIG. 3 is a structural view of an object recognition apparatus of a second embodiment.

FIG. 3 shows the structure of the object recognition apparatus 200.

The object recognition apparatus 200 includes an image input unit 201, an object detection unit 202, a diffuse reflection image generation unit 203, an object model storage unit 204, a difference image generation unit 205, a reflection component judgment unit 206, a pixel value replacement unit 207, a difference image correction unit 208, a weight calculation unit 209, a weighted Gaussian filter application unit 210, a filter processing unit 211, and an identification unit 212.

Incidentally, the image input unit 201 performs the same processing as the image input unit 101; the object detection unit 202, as the object detection unit 102; the diffuse reflection image generation unit 203, as the diffuse reflection image generation unit 103; the object model storage unit 204, as the object model storage unit 104; and the difference image generation unit 205, as the difference image generation unit 105.

Besides, the weight calculation unit 209 performs the same processing as the weight calculation unit 106 in FIG. 1; the weighted Gaussian filter application unit 210, as the weighted Gaussian filter application unit 107 in FIG. 1; the filter processing unit 211, as the filter processing unit 108 in FIG. 1; and the identification unit 212, as the identification unit 109 in FIG. 1.

(2) Reflection Component Judgment Unit 206

The reflection component judgment unit 206 uses a pixel value I' (x, y) of a difference image I' outputted from the difference image generation unit 205 and judges the reflection component of each pixel (x, y) of an input image I. When a pixel value I' (x, y) of the difference image I' has a positive value and exceeds a threshold, it is outputted that the pixel is a specular reflection area.

(3) Pixel Value Replacement Unit 207

The pixel value replacement unit 207 replaces the pixel value I(x, y) of the input image I, which has been outputted as the specular reflection area in the reflection component judgment unit 206, by a pixel value interpolated from surrounding pixels, or replaces it by a pixel value I⁻(x, y) of a diffuse reflection image I⁻ outputted from the diffuse reflection image generation unit 203.

In order to prevent that the pixel value replaced in the input image I becomes discontinuous with the pixel value of the surrounding pixel, the weighted linear combination of the input image I and the diffuse reflection image I⁻ may be used.

When the pixel value of a pixel on the difference image I' is small, a large weight is assigned to a corresponding pixel on the input image I; and when the pixel value of a pixel on the difference image I' is large, a large weight is assigned to a corresponding pixel on the diffuse reflection image I⁻.

(4) Difference Image Correction Unit 208

The difference image correction unit 208 replaces the pixel value of the difference image I', which has been outputted as the specular reflection area in the reflection component judgment unit 206, by a predetermined value (for example, 0).

(5) Advantageous Effects of the Second Embodiment

In the object recognition apparatus 200 of this embodiment, even in the case where the shadow area and the specular reflection area are generated in the face image, the intrinsic feature effective for recognition is extracted; and thus, the face recognition with high accuracy is achieved.

Third Embodiment

The object recognition apparatus 300 of the third embodiment will be described with reference to FIG. 4.

Figure 4:
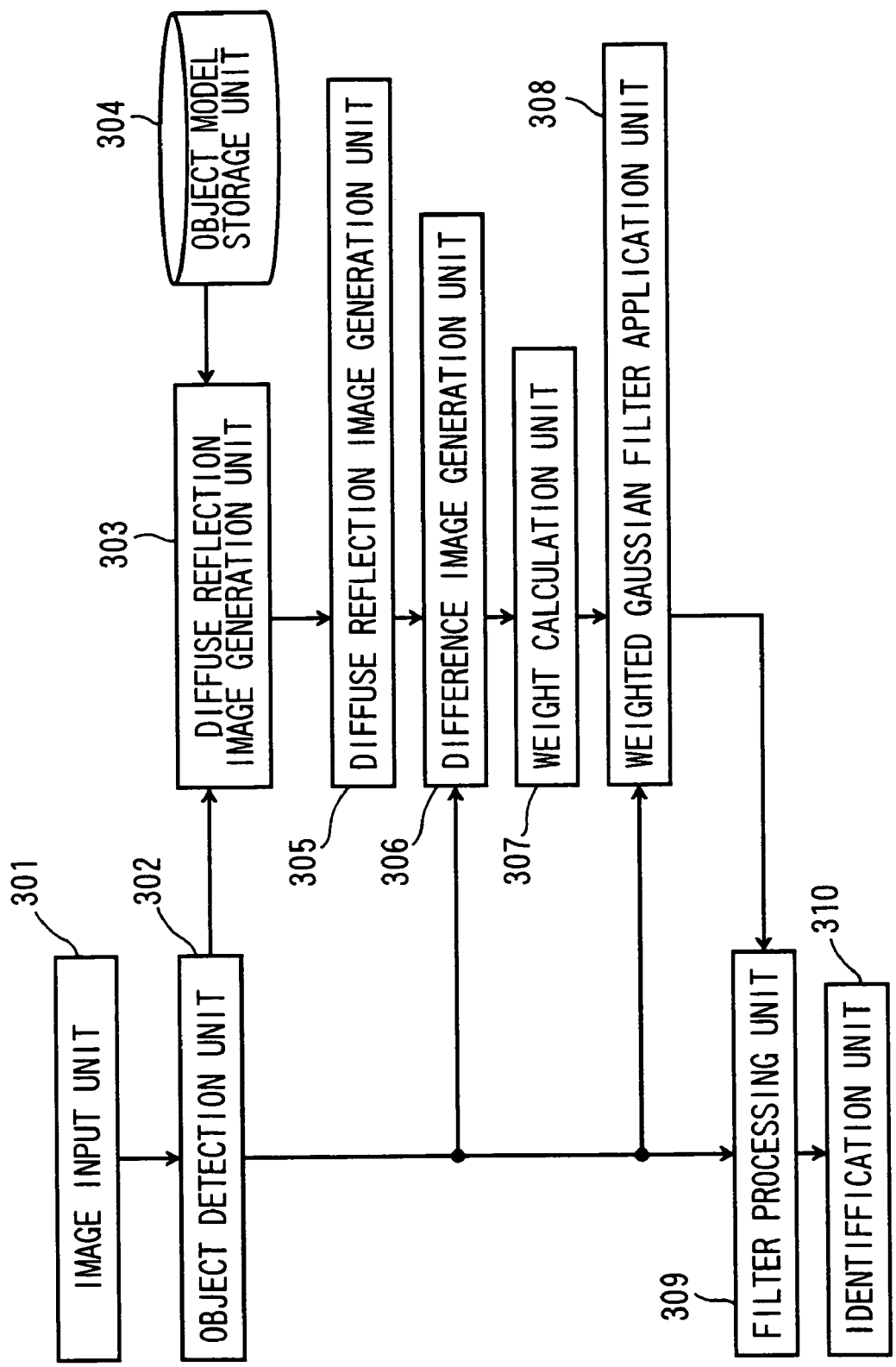
FIG. 4 is a structural view of an object recognition apparatus of a third embodiment.

FIG. 4 shows the structure of the object recognition apparatus 300. The object recognition apparatus 300 includes an image input unit 301, an object detection unit 302, an object model selection unit 303, an object model storage unit 204, a diffuse reflection image generation unit 305, a difference image generation unit 306, a weight calculation unit 307, a weighted Gaussian filter application unit 308, a filter processing unit 309, and an identification unit 310.

The image input unit 301 performs the same processing as the image input unit 101 in FIG. 1; and the object detection unit 302, as the object detection unit 102 in FIG. 1.

The object model selection unit 303 estimates the face direction of a face image outputted from the object detection unit 302, and selects a suitable model from plural diffuse reflection image generation models stored in the object model storage unit 304. The diffuse reflection image generation models stored in the object model storage unit 304 are models respectively for different facing directions and different face portions.

The diffuse reflection image generation unit 305 uses the diffuse reflection image generation model selected by the object model selection unit 303 and performs the same processing as the diffuse reflection image generation unit 103 in FIG. 1.

The difference image generation unit 306 performs the same processing as the difference image generation unit 105 in FIG. 1; the weight calculation unit 307, as the weight calculation unit 106 in FIG. 1; the weighted Gaussian filter application unit 308, as the weighted Gaussian filter application unit 107 in FIG. 1; the filter processing unit 309, as the filter processing unit 108; and the identification unit 310, as the identification unit 109 in FIG. 1.

In the object recognition apparatus 300 of this embodiment, even in the case where the facing direction of the face image is directed not only in the front direction but also in various directions, the intrinsic feature robust against varying illumination is extracted; and thus, the face recognition with high accuracy is achieved.

Fourth Embodiment

The object recognition apparatus 400 of the fourth embodiment will be described with reference to FIG. 5.

(1) Structure of the Object Recognition Apparatus 400

Figure 5:
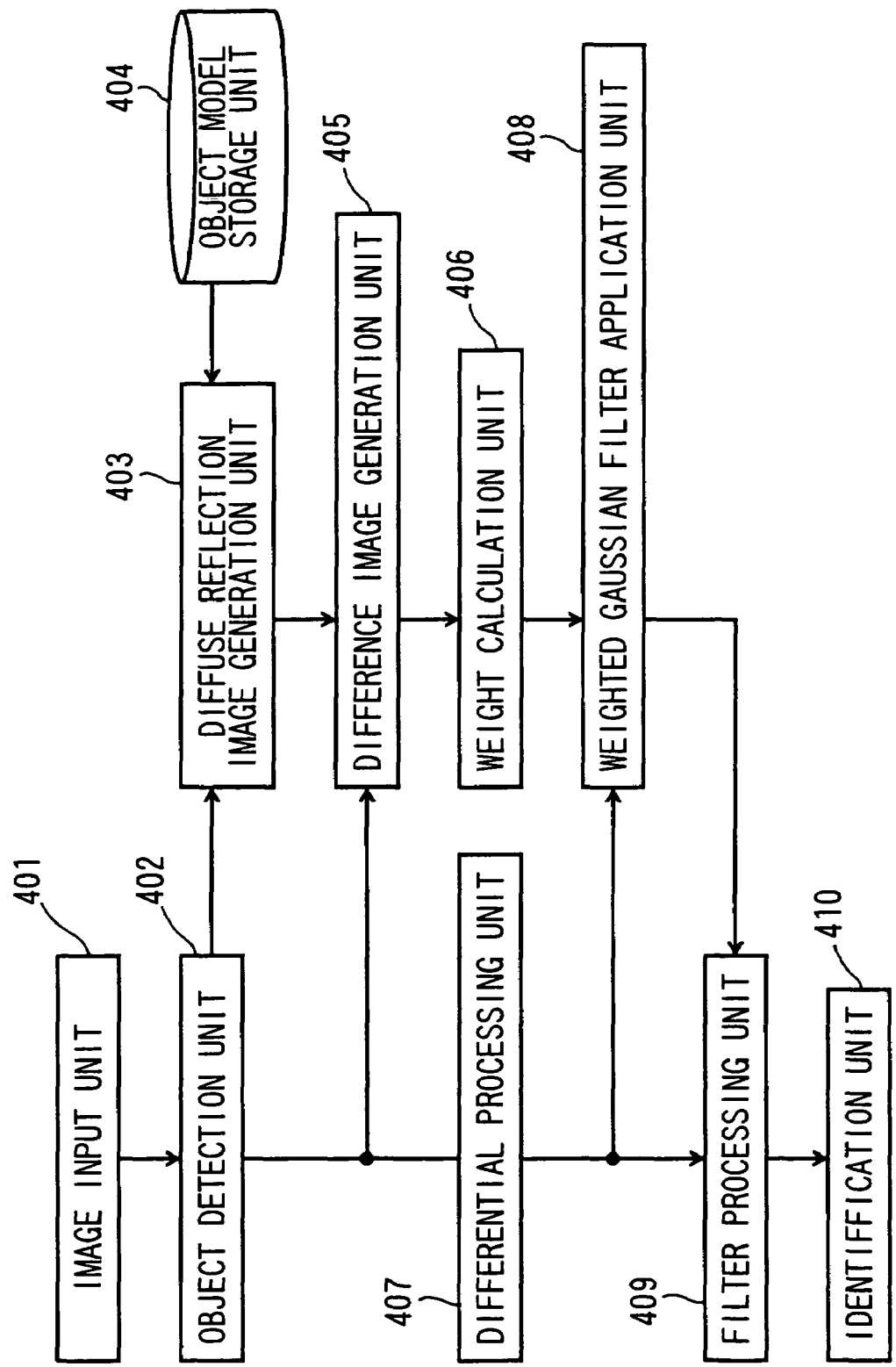
FIG. 5 is a structural view of an object recognition apparatus of a fourth embodiment.

FIG. 5 shows the structure of the object recognition apparatus 400.

The object recognition apparatus 400 includes an image input unit 401, an object detection unit 402, a diffuse reflection image generation unit 403, an object model storage unit 404, a difference image generation unit 405, a weight calculation unit 406, a differential processing unit 407, a weighted Gaussian filter application unit 408, a filter processing unit 409, and an identification unit 410.

Incidentally, the image input unit 401 performs the same processing as the image input unit 101 in FIG. 1; the object detection unit 402, as the object detection unit 102 in FIG. 1; the diffuse reflection image generation unit 403, as the diffuse reflection image generation unit 103 in FIG. 1; the object model storage unit 404, as the object model storage unit 104 in FIG. 1; the difference image generation unit 405, as the difference image generation unit 105 in FIG. 1; and the weight calculation unit 406, as the weight calculation unit 106 in FIG. 1. In addition, the identification unit 410 performs the same processing as the identification unit 109 in FIG. 1.

(2) Differential Processing Unit 407

The differential processing unit 407 takes a difference between a noted pixel of an input image and its surrounding pixel to remove noise. When it is feasible to assume that uniform noise is generated in the vicinity of the noted pixel, the noise can be removed by, for example, expression (10).

$$\hat{I}(x,y) = |I(x,y) - I(x,y+1)| \tag{10}$$

In place of the expression (10), a Difference-of-Gaussian filter, a band pass filter by application of discrete Fourier transform, or the like may be used.

Specular reflection component may be removed by a similar method when it is feasible to assume that values of specular reflection component also are even at pixels in the vicinity of a noted pixel; in other words, when it is assumed that pixels within a local area have same value of specular reflection component, the normal line directions of the pixel regions are even within the local area, and the viewpoint is an infinite point. However, this is limited to a case where an observation value falls in the dynamic range of a camera.

(3) Weighted Gaussian Filter Application Unit 408

The weighted Gaussian filter application unit 408 uses the weight outputted from the weight calculation unit 406, and applies the weighted Gaussian filter to the differential input image outputted from the differential processing unit 407.

The weighted Gaussian filter $W(x,y)G(x,y)$ is applied to the differential image $\tilde{I}(x,y)$ by expression (11).

$$S(x,y) = (W(x,y)G(x,y)) * \hat{I}(x,y)) \tag{11}$$

Where, $|\cdot|$ denotes an absolute value, and $*$ denotes convolution.

(4) Filter Processing Unit 409

The filter processing unit 409 uses a smoothed image outputted from the weighted Gaussian filter application unit 408, and applies the processing of expression (12) to the image outputted from the differential processing unit 407.

$$\hat{R}(x, y) = \frac{\hat{I}(x, y)}{S(x, y)} \tag{12}$$

In order to remove an outlier in the feature image $\hat{R}$, a threshold processing using the mean and variance of pixel values may be performed. Conversion into the feature vector is performed by raster scanning the feature image $\hat{R}$.

(5) Advantageous Effects of the Fourth Embodiment

In the object recognition apparatus 400 of this embodiment, the noise of a camera system generated in the case where the lighting condition is bad, as in a dark environment, is removed, the intrinsic feature robust against varying illumination is extracted, and the personal identification with high accuracy is achieved.

Modified Examples

The invention is not limited to the above embodiments, but can be variously modified within the scope not departing from the gist thereof.

The invention may be applied to recognition of objects in general, using an image. For example, the invention is applicable not only to a person's face but also to various actual objects which images are feasible to be captured.

The image after the filter processing and outputted from the filter processing unit 108 may be stored in a passport or the like and may be used for recognition of a person.

Further, in place of the weighted Gaussian filter, any weighted smoothing filter may be used. For example, a linear filter or a filter defined by $COS^n$ ($n>2$) may be used as the smoothing filter.

What is claimed is:

1. An image processing apparatus comprising:
    a diffuse reflection image generation unit configured to generate a diffuse reflection image by using a base image having a diffuse reflection component as a main component, the diffuse reflection image approximating an input image;
    a difference image generation unit configured to generate a difference image between the diffuse reflection image and the input image;
    a reflection component judgment unit configured to judge whether each pixel on the input image is of a specular reflection area or not, by using a pixel value of a corresponding pixel on the difference image;
    a pixel value replacement unit configured to modify or replace the pixel value of the each pixel judged to be of the specular reflection area, by using a pixel value of a corresponding pixel on the diffuse reflection image, thereby obtaining a replaced input image;
    a difference image correction unit configured to correct the pixel value of the corresponding pixel on the difference image, which corresponds to the each pixel judged to be of the specular reflection area, thereby obtaining a corrected difference image;
    a weight calculation unit configured to calculate a weight of a weighted smoothing filter, and to compare a pixel value of a noted pixel with a pixel value of a pixel surrounding the noted pixel in the corrected difference image to assign to the surrounding pixel a weight that decreases with an increase of the difference value;
    a first filter unit configured to generate a smoothed image by applying the weighted smoothing filter to the replaced input image; and
    a second filter unit configured to obtain a feature image by dividing a pixel value of each pixel of the replaced input image by a pixel value of corresponding pixel of the smoothed image.

2. The image processing apparatus according to claim 1, further comprising an object model selection unit to estimate a direction of an object of the input image and to select the base image in accordance with the estimated direction.

3. The image processing apparatus according to claim 1, further comprising a differential processing unit to obtain a differential input image by applying a differential filter to the input image, wherein the first and second filter units use the differential input image to obtain the smoothed image and the feature image respectively.

4. The image processing apparatus according to claim 1, wherein the weight calculation unit obtains another difference value between pixel values of a noted pixel and its surrounding pixel on the weighted smoothing filter, and assigns to such surrounding pixel a weight that decreases with increase of the another difference value.

5. The image processing apparatus according to claim 1, wherein the pixel value replacement unit replaces a pixel value of the each pixel judged to be of the specular reflection area, by a pixel value of the corresponding pixel on the diffuse reflection image; or by a value obtained by interpolation from pixel values of pixels surrounding the corresponding pixel on the diffuse reflection image.

6. The image processing apparatus according to claim 1, wherein the weighted smoothing filter is a weighted Gaussian filter.

7. The image processing apparatus according to claim 1, wherein an object is identified from the feature image on which the object appears.

8. The image processing apparatus according to claim 1, wherein the weight calculation unit uses a plurality of pixels in an area including the noted pixel on the difference image, as the surrounding pixels.

9. An image processing method comprising:
generating a diffuse reflection image by using a base image having a diffuse reflection component as a main component, the diffuse reflection image approximating an input image;
generating a difference image between the diffuse reflection image and the input image;
judging whether each pixel on the input image is of a specular reflection area or not, by using a pixel value of a corresponding pixel on the difference image;
modifying or replacing the pixel value of the each pixel judged to be of the specular reflection area, by using a pixel value of a corresponding pixel on the diffuse reflection image, thereby obtaining a replaced input image;
correcting the pixel value of the corresponding pixel on the difference image, which corresponds to the each pixel judge to be of the specular reflection area, thereby obtaining a corrected difference image;
calculating a weight of a weighted smoothing filter, the calculating including comparing a pixel value of a noted pixel to a pixel value of a pixel surrounding the noted pixel in the corrected difference image to assign to the surrounding pixel a weight that decreases with an increase of the difference value;
generating a smoothed image by applying the weighted smoothing filter to the replaced input image; and
obtaining a feature image by dividing a pixel value of each pixel on the replaced input image by a pixel value of the corresponding pixel on the smoothed image.

10. A program stored in a computer-readable medium for causing a computer to perform an image processing method, the program comprising instructions for causing the computer to perform steps of:
generating a diffuse reflection image by using a base image having a diffuse reflection component as a main component, the diffuse reflection image approximating an input image;
generating a difference image between the diffuse reflection image and the input image;
judging whether each pixel on the input image is of a specular reflection area or not, by using a pixel value of a corresponding pixel on the difference image;
modifying or replacing the pixel value of the each pixel judged to be of the specular reflection area, by using a pixel value of a corresponding on the diffuse reflection image, thereby obtaining a replaced input image;
correcting the pixel value of the corresponding pixel on the difference image, which corresponds to the each pixel judge to be of the specular reflection area, thereby obtaining a corrected difference image;
calculating a weight of a weighted smoothing filter, the calculating including comparing a pixel value of a noted pixel to a pixel value of a pixel surrounding the noted pixel in the corrected difference image to assign to the surrounding pixel a weight that decreases with an increase of the difference value;
generating a smoothed image by applying the weighted smoothing filter to the replaced input image; and
obtaining a feature image by dividing a pixel value of each pixel on the replaced input image by a pixel value of corresponding pixel on the smoothed image.

* * * * *